US012246942B2

(12) United States Patent
Lendi et al.

(10) Patent No.: US 12,246,942 B2
(45) Date of Patent: Mar. 11, 2025

(54) LIMIT-CURVE CONTROL SYSTEM FOR ELEVATORS

(71) Applicant: Cedes AG, Landquart (CH)

(72) Inventors: Marcial Lendi, Näfels (CH); Alex Ackermann, Heiligkreuz (CH)

(73) Assignee: CEDES AG, Landquart (CH)

( * ) Notice: Subject to any disclaimer, the term of this patent is extended or adjusted under 35 U.S.C. 154(b) by 1322 days.

(21) Appl. No.: 16/887,449

(22) Filed: May 29, 2020

(65) Prior Publication Data

US 2020/0377333 A1 Dec. 3, 2020

(30) Foreign Application Priority Data

May 31, 2019 (EP) .................................. 19 177 688

(51) Int. Cl.
*B66B 1/40* (2006.01)
*B66B 5/00* (2006.01)

(52) U.S. Cl.
CPC .............. *B66B 1/40* (2013.01); *B66B 5/0031* (2013.01); *B66B 5/00* (2013.01)

(58) Field of Classification Search
CPC ........... B66B 1/40; B66B 5/0031; B66B 5/00; B66B 5/0018
See application file for complete search history.

(56) References Cited

U.S. PATENT DOCUMENTS

| | | | | |
|---|---|---|---|---|
| 2004/0173413 | A1 | 9/2004 | Angst et al. | |
| 2009/0277724 | A1 | 11/2009 | Thumm et al. | |
| 2019/0002245 | A1* | 1/2019 | Birrer | B66B 13/143 |
| 2020/0377334 | A1* | 12/2020 | Lendi | B66B 5/0031 |

FOREIGN PATENT DOCUMENTS

| | | | | |
|---|---|---|---|---|
| EP | 2 022 742 | A1 | 2/2009 | |
| EP | 2 583 928 | A1 | 4/2013 | |
| EP | 3 279 124 | A1 | 2/2018 | |
| WO | 03/004397 | A1 | 1/2003 | |
| WO | WO-2006082275 | A2 * | 8/2006 | B66B 1/28 |

OTHER PUBLICATIONS

Extended European Search Report (Application No. 19177688.9) dated Dec. 6, 2019.

* cited by examiner

*Primary Examiner* — Jeffrey Donels
(74) *Attorney, Agent, or Firm* — BURR PATENT LAW, PLLC

(57) ABSTRACT

Method for monitoring the speed of an elevator car, with the car door in particular unlocked, within the unlocking zone of the elevator shaft, having a first speed-limit curve, having a first switchover event, having a second speed-limit curve, and having a second switchover event. The first speed-limit curve has a range of values between a first maximum value at the entry to the unlocking zone and a first minimum value at the envisaged stopping point. The first switchover event corresponds to the car traveling beyond the stopping point or to a stoppage within the unlocking zone. The second speed-limit curve has a range of values between a second maximum value at the envisaged stopping point and one or two second minimum values at the entry to, and exit from, the unlocking zone. The second switchover event corresponds to a departure signal or to the locking of the car door.

8 Claims, 1 Drawing Sheet

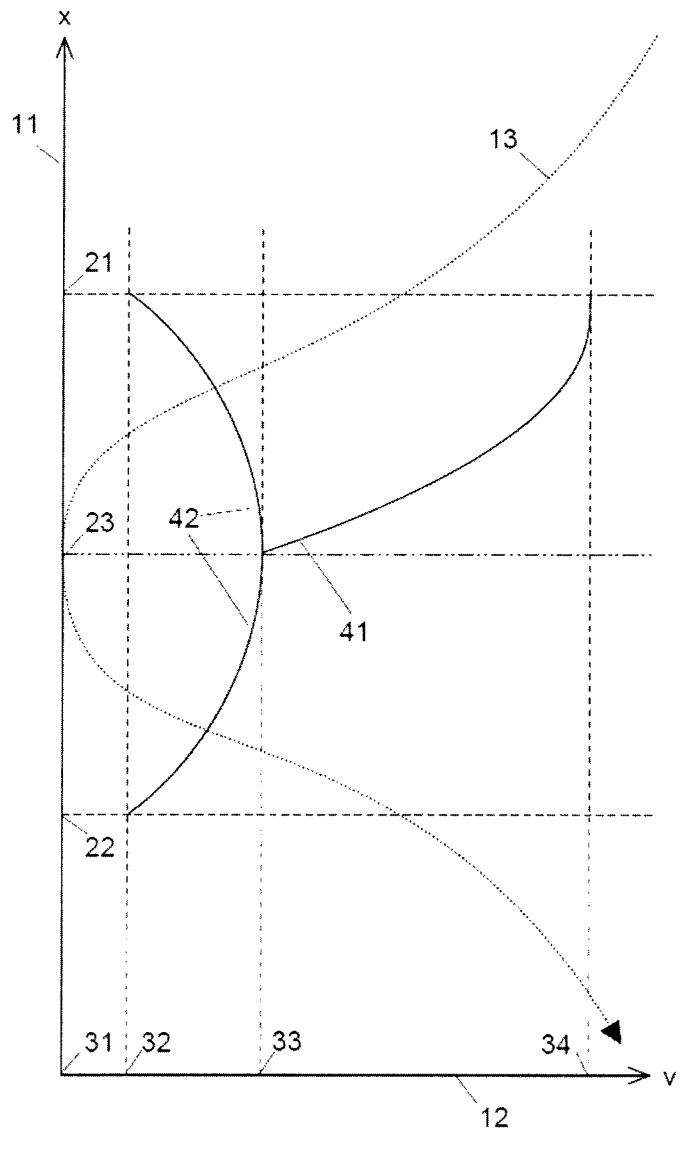
x
11
13
21
23
42
41
22
31
32
33
34
v
12

LIMIT-CURVE CONTROL SYSTEM FOR ELEVATORS

This application claims the benefit under 35 USC § 119(a)-(d) of European Application No. 19 177 688.9 filed May 31, 2019, the entirety of which is incorporated herein by reference.

FIELD OF THE INVENTION

The present invention relates to a method for monitoring the speed of the car of an elevator using limit curves.

BACKGROUND OF THE INVENTION

Prior art documents EP 3 279 124 A1, KONE, 2018, and EP 2 022 742 A1, ThyssenKrupp Elevator AG, 2009, disclose methods in which limit curves are used to monitor the speed of the car of an elevator.

SUMMARY OF THE INVENTION

It is the object of the present invention to provide an improved method of the type mentioned.

The method according to the present invention is a method for monitoring the speed of a car of an elevator, with the car door, in particular, unlocked, within the unlocking zone of the elevator shaft, having a first speed-limit curve, having a first switchover event, having a second speed-limit curve, and having a second switchover event. The first speed-limit curve has a range of values between a first maximum value at the entry to the unlocking zone and a first minimum value at the envisaged stopping point. The first switchover event corresponds to the car traveling beyond the stopping point or to a stoppage within the unlocking zone. The second speed-limit curve has a range of values between a second maximum value at the envisaged stopping point and one or two second minimum values at the entry to, and exit from, the unlocking zone. The second switchover event corresponds to a departure signal, in particular, to the locking or the closure of the car door.

The method monitors the speed of the car, with the car door unlocked, following entry of the car into the unlocking zone until the occurrence of the first switchover event when the first speed-limit curve is reached or exceeded, and following occurrence of the first switchover event until the occurrence of the second switchover event when the second speed-limit curve is reached or exceeded, and, in the event of one of the limit curves being reached or exceeded, it initiates an alarm reaction.

The method can create the advantage that, despite a high traveling speed, in the event of deviations from the respectively permissible speed, the car has a shorter braking distance and/or comes to a standstill more quickly. This can increase the safety of the elevator.

Car is intended to mean the cabin of the elevator. The car may have one or more doors. Unlocked means that at least one car door is unlocked. Locked means all the car doors are locked. In the event of elevators not having locking capability, locked means closed and unlocked means open. Unlocked is intended to mean an unlocked state at least of one car door, irrespective of whether the car door is open or closed. The stopping point is the floor level of the stopping point at which the elevator car comes to a stop. The unlocking zone is that region below and above a stopping point in which the floor of the cabin has to be located in order for it to be possible for the shaft door to be unlocked at this stopping point. The first speed-limit curve corresponds to the range of limit values for the speed of the car as it arrives, and brakes, in the unlocking zone. The maximum speed of the car is limited by the permissible arrival speed. The second speed-limit curve corresponds to the range of limit values for the speed of the car as it is adjusted, in order for the level of the floor of the car to be aligned with the level of the floor of the building. The alarm reaction can be the opening of the safety circuit, the reduction in the the drive speed, the switching off of the motor drive, the activation of the motor brake, of the brake of the traction sheave, or of the cable brake, or the activation of the emergency brakes of the car. All the positions of the car relate at all times to the floor level of the car. The minimum and maximum values mentioned here and in the following text can come from country-specific, legal requirements and, in particular, corresponding standards.

The first speed-limit curve preferably has a first maximum value, which is smaller than or equal to the highest permissible speed of a car within an unlocking zone envisaged for arrival, in particular smaller than or equal to 0.8 m/s. The first speed-limit curve preferably has a first minimum value, which is smaller than or equal to the highest permissible speed of a car, with the door unlocked, within an unlocking zone, in particular smaller than or equal to 0.3 m/s. The first speed-limit curve preferably declines continuously, in particular continuously to a progressive extent, between the first maximum value and the first minimum value.

This can create the advantage that the speed of the car within the unlocking zone, within which the car comes to a stop, always remains below the permissible value. This can create the advantage that, when the car is being braked within the unlocking zone, the speed inevitably is being reduced, or is reduced, within the limits of the first speed-limit curve, such that the speed of the car in the region of the stopping point is below the maximum permissible value for the adjustment of the floor level, and therefore adjustment of the car can be initiated immediately after the braking operation, even before the car comes to a standstill.

The second speed-limit curve preferably has a second maximum value, which is smaller than or equal to the highest permissible speed of a car, with the car door unlocked, within an unlocking zone, in particular smaller than or equal to 0.3 m/s. The second speed-limit curve preferably has one or two second minimum values, which are smaller than or equal to the highest permissible speed of a car, with the car door unlocked, within an unlocking zone, in particular smaller than or equal to 0.3 m/s, in particular 0 m/s. The second speed-limit curve preferably declines continuously, in particular continuously to a progressive extent, between the second maximum value and the one or two second minimum values.

This can create the advantage that, in the event of the floor level being adjusted at the stopping point at which the car comes to a stop, the speed of the car always remains below the permissible value.

The first minimum value of the first speed-limit curve is preferably equal to the second maximum value of the second speed-limit curve.

This can create the advantage that, when the car is being braked within the unlocking zone, the speed inevitably is being reduced, or is reduced, within the limits of the first speed-limit curve, such that the speed of the car in the region of the stopping point is below the maximum permissible value for the adjustment of the floor level, and therefore adjustment of the car can be initiated immediately after the braking operation, even before the car comes to a standstill.

This can also create the advantage that, in the event of the first speed-limit curve being adhered to during braking, it is also the case that the second speed-limit curve for the adjustment of the height level of the floor is adhered to automatically when the region around the stopping point is reached.

The unlocking zone preferably has an extent which meets requirements. The unlocking zone preferably has an extent of smaller than or equal to 35 cm, or smaller than or equal to 20 cm, above and below the stopping point.

The method preferably has a tolerance range for the stoppage of the car of smaller than or equal to 2 cm above and below the stopping point.

The elevator-control system according to the present invention is an elevator-control system for an elevator with a car in an elevator shaft, having a first speed-limit curve, having a first switchover event, having a second speed-limit curve, and having a second switchover event according to the aforementioned method, wherein the elevator-control system is designed to implement the aforementioned method.

This can create the aforementioned advantages.

The elevator according to the present invention is an elevator with a car in an elevator shaft, having an aforementioned elevator-control system.

This can create the aforementioned advantages.

Further features of the present invention are specified in the drawings.

The advantages mentioned in each case can also be implemented for combinations of features in the context of which they have not been mentioned.

BRIEF DESCRIPTION OF THE DRAWING

Exemplary embodiments of the present invention are illustrated in the drawings and will be explained in more detail hereinbelow. Like reference signs in the individual FIGURES here denote corresponding elements.

FIG. 1 shows a diagram of the limit curves.

DETAILED DESCRIPTION OF THE INVENTION

FIG. 1 shows a diagram of the limit curves.

The axis 11 shows the possible height position of the car of an elevator around a stopping point 23. The stopping point is surrounded by an unlocking zone, with an upper boundary of the unlocking zone 21 and a lower boundary of the unlocking zone. Within the unlocking zone, it is possible, in accordance with certain requirements, for the car to travel, under certain conditions, with the car door unlocked.

The axis 12 shows the speed of a car of an elevator in the region of an unlocking zone and has various speed barriers 31, 32, 33 and 34. The maximum permissible arrival speed 34 for the arrival of the car in the unlocking zone corresponds to the first maximum value 34 of the first speed-limit curve 41. The minimum permissible adjustment speed 33 corresponds to the first minimum value 33 of the first speed-limit curve 41 and to the second maximum value 33 of the second speed-limit curve 42. The minimum adjustment speed 32 corresponds to the minimum value or values 32 of the second speed-limit curve 42. The zero point of the speed 31 corresponds to the car being at a standstill.

The first speed-limit curve 41 begins at the upper boundary of the unlocking zone 21 with the maximum permissible adjustment speed 34 and reduces the speed continuously and in a progressively declining manner to the maximum permissible adjustment speed 34 at the position of the stopping point. The first speed-limit curve 41 is a limit curve of speed as a function of position.

The second speed-limit curve 42 begins at the upper boundary of the unlocking zone 21 with the minimum adjustment speed 32 and rises continuously, with an ever-decreasing upward slope to the maximum adjustment speed 33 at the position of the stopping point 23, in order to decline from there continuously, to an ever-decreasing extent, to the minimum adjustment speed 32 at the lower boundary of the unlocking zone 22. The speed-limit curve 42 always remains above the speed 0. The first speed-limit curve 42 is a limit curve of speed as a function of position.

At the position of the stopping point, the speed curve 41 is in contact with the speed curve 42 at the maximum permissible adjustment speed 33.

The speed profile 13 of the car shows the car entering into the unlocking zone (21, 22) at the upper boundary of the unlocking zone 21 at a speed below the maximum permissible limit speed 42. Following entry into the unlocking zone (21, 22), the car door is unlocked and begins to open. The speed profile 13 of the car continues to run below the speed of the first limit curve 41 until it comes to a standstill in the region of the stopping point 23. Following the standstill, it is possible to adjust the position of the car at a speed below the second speed-limit curve 42. Following the closure and locking of the door(s) for departure, the speed profile 13 runs independently of the maximum permissible adjustment speed 33 and of the maximum permissible arrival speed 34.

Within an unlocking zone (21, 22), with the car door unlocked, the maximum arrival speed 34 is equal to 0.8 m/s (5.12.1.4.c) and the maximum adjustment speed is equal to 0.3 m/s (5.12.1.4.d), a stoppage (5.6.7.1) having to be initiated on some occasions and with specific conditions (5.6.7.5). An unlocking zone has a maximum extent of 20 cm below and above the stopping point, when the doors of the car and shaft are not driven jointly, and of 35 cm, when the doors of the car and shaft are driven jointly. This means that the upper and the lower boundaries of the unlocking zone are each at a distance of 20 cm or 35 cm from the stopping point.

The method according to the present invention makes it possible to adhere better to these conditions for the purpose of eliminating stopping in the event of an alarm reaction.

LIST OF REFERENCE SIGNS

11 Height position of the floor level of the car
12 Speed of the car
13 Speed profile of the car
21 Upper boundary of the unlocking zone
22 Lower boundary of the unlocking zone
23 Stopping point (floor level of the story)
31 Zero point of the speed
32 Minimum adjustment speed
33 Maximum permissible adjustment speed
34 Maximum permissible arrival speed
41 First limit speed-limit curve
42 Second limit speed-limit curve

The invention claimed is:

1. A method for monitoring a speed of an elevator car when an elevator car door is in an unlocked state within an unlocking zone of an elevator shaft, the method comprising:

defining a first speed-limit curve, with a range of values between a first maximum value at an entry to the unlocking zone, and a first minimum value at a predetermined stopping point, having a first switchover event, which corresponds to the elevator car traveling beyond the predetermined stopping point or to a stoppage within the unlocking zone; and defining a second speed-limit curve, with a range of values between a second maximum value at the predetermined stopping point and one or two second minimum values set at an entry to, and an exit from the unlocking zone, having a second switchover event, which corresponds to a departure signal related to a locking or a closing of the elevator car door, wherein a speed of the elevator car, when the elevator car door is unlocked, is monitored following entry of the elevator car into the unlocking zone until an occurrence of the first switchover event, when the first speed-limit curve is reached or exceeded, and is monitored following the occurrence of the first switchover event until the occurrence of the second switchover event, when the second speed-limit curve is reached or exceeded, and wherein, in the event that one of the speed-limit curves is reached or exceeded, an alarm reaction is initiated.

2. The method according to claim 1, wherein the first speed-limit curve has a first maximum value, which is smaller than or equal to a highest permissible speed of the elevator car within a predetermined arrival unlocking zone, and which is smaller than or equal to 0.8 m/s, and/or has a first minimum value, which is smaller than or equal to the highest permissible speed of the elevator car, with the elevator car door unlocked, within the unlocking zone and which is smaller than or equal to 0.3 m/s, and/or declines continuously, to a progressive extent, between the first maximum value and the first minimum value.

3. The method according to claim 1, wherein the second speed-limit curve has a second maximum value, which is smaller than or equal to a highest permissible speed of the elevator car, with the elevator car door unlocked within the unlocking zone, and which is smaller than or equal to 0.3 m/s, and/or has one or two second minimum values, which are smaller than or equal to the highest permissible speed of the elevator car, with the elevator car door unlocked, within the unlocking zone, and which is smaller than or equal to 0.3 m/s, and/or declines continuously to a progressive extent, between the second maximum value and the one or two second minimum values.

4. The method according to claim 1, wherein the first minimum value of the first speed-limit curve is equal to the second maximum value of the second speed-limit curve.

5. The method according to claim 1, wherein the unlocking zone has an extent which meets a legal requirement that the extent is smaller than or equal to 35 cm above and below the stopping point.

6. The method according to claim 1, wherein a tolerance range for stopping the elevator car is smaller than or equal to 2 cm above and below the stopping point.

7. An elevator-control system for an elevator with a car in an elevator shaft, having a first limit curve, having a first switchover event, having a second limit curve, and having a second switchover event, and wherein the elevator-control system is designed to implement a method according to claim 1.

8. An elevator with a car in an elevator shaft, having an elevator-control system according to claim 7.

* * * * *